United States Patent
Koizumi et al.

(10) Patent No.: US 9,261,678 B2
(45) Date of Patent: Feb. 16, 2016

(54) WIDE ANGLE LENS AND IMAGING APPARATUS

(71) Applicant: FUJIFILM Corporation, Tokyo (JP)

(72) Inventors: Noboru Koizumi, Saitama-ken (JP); Michio Cho, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/582,843

(22) Filed: Dec. 24, 2014

(65) Prior Publication Data

US 2015/0109690 A1    Apr. 23, 2015

Related U.S. Application Data

(63) Continuation of application No. PCT/JP2013/003925, filed on Jun. 24, 2013.

(30) Foreign Application Priority Data

Jul. 5, 2012 (JP) ................. 2012-151318

(51) Int. Cl.
*G02B 13/04* (2006.01)
*G02B 13/06* (2006.01)
*G02B 9/64* (2006.01)

(52) U.S. Cl.
CPC ........ *G02B 13/04* (2013.01); *G02B 9/64* (2013.01); *G02B 13/06* (2013.01)

(58) Field of Classification Search
USPC ........................................................ 359/749
See application file for complete search history.

(56) References Cited

U.S. PATENT DOCUMENTS

| 5,742,439 A | * | 4/1998 | Schuster ........... G02B 13/00 359/749 |
| 2004/0136095 A1 | | 7/2004 | Suzuki |
| 2012/0327372 A1 | | 12/2012 | Otani et al. |

FOREIGN PATENT DOCUMENTS

| JP | 08-94926 | 4/1996 |
| JP | 2004-117519 | 4/2004 |
| JP | 2004-219610 | 8/2004 |
| JP | 2013-003566 | 1/2013 |

OTHER PUBLICATIONS

International Search Report, PCT/2013/003925, Oct. 1, 2013.

* cited by examiner

*Primary Examiner* — James Jones
(74) *Attorney, Agent, or Firm* — Young & Thompson

(57) ABSTRACT

A wide angle lens consists of a first lens group having negative refractive power as a whole, a second lens group having positive refractive power as a whole, and a third lens group having positive refractive power as a whole in this order from an object side. The first lens group consists of a positive meniscus lens with its convex surface facing the object side and three negative meniscus lenses, each with its convex surface facing the object side, in this order from the object side. The second lens group includes at least two cemented lenses. The third lens group consists of a 3a-th lens group consisting of a positive meniscus lens with its convex surface facing the object side and a 3b-th lens group that includes at least two cemented lenses and has positive refractive power as a whole, in this order from the object side.

17 Claims, 10 Drawing Sheets

EXAMPLE 1

EXAMPLE 1

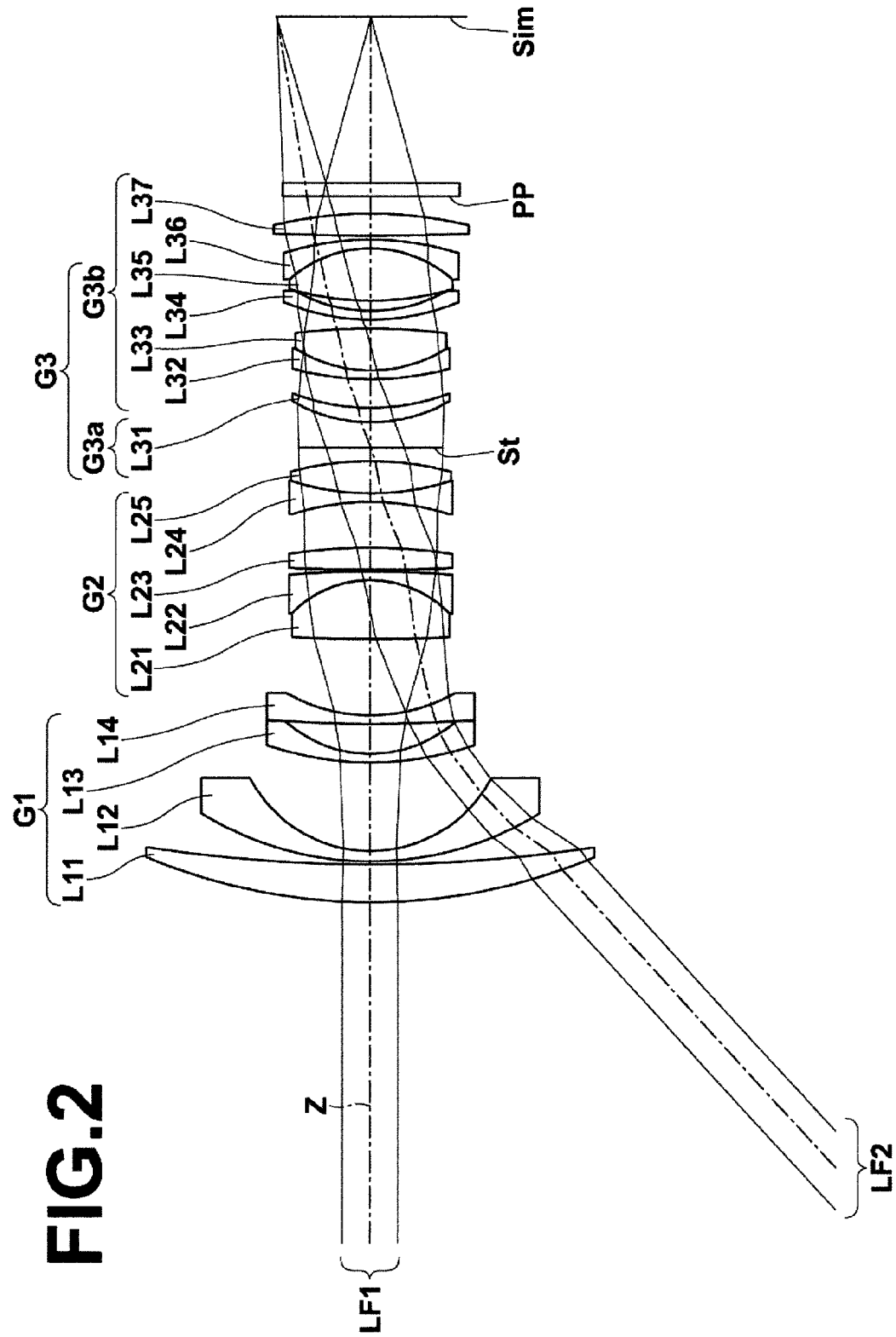

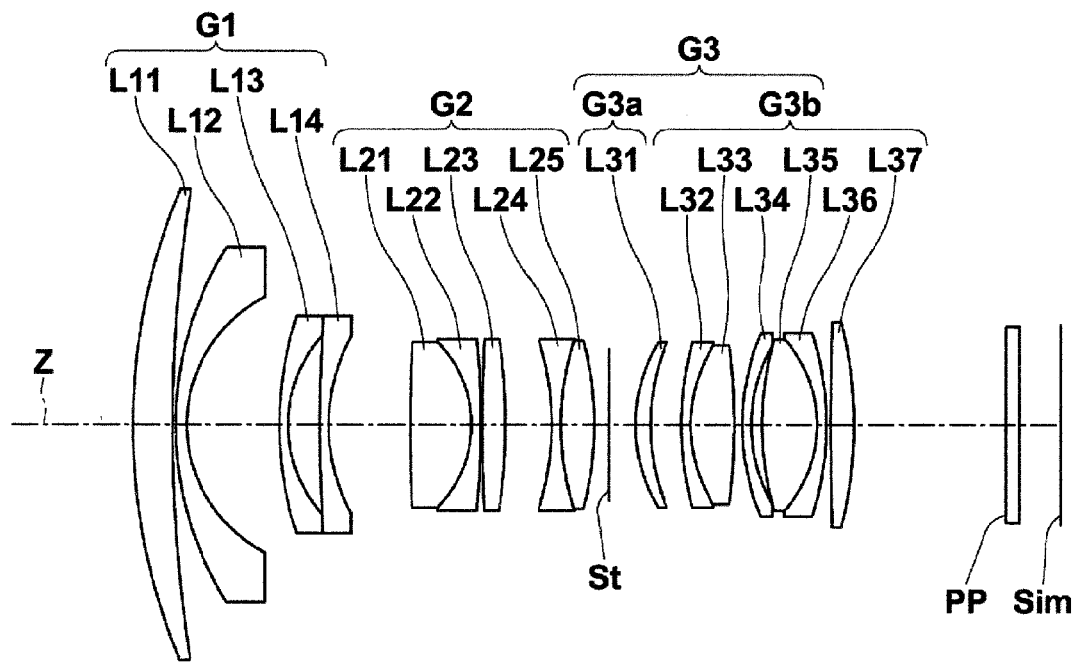
FIG.3  EXAMPLE 2
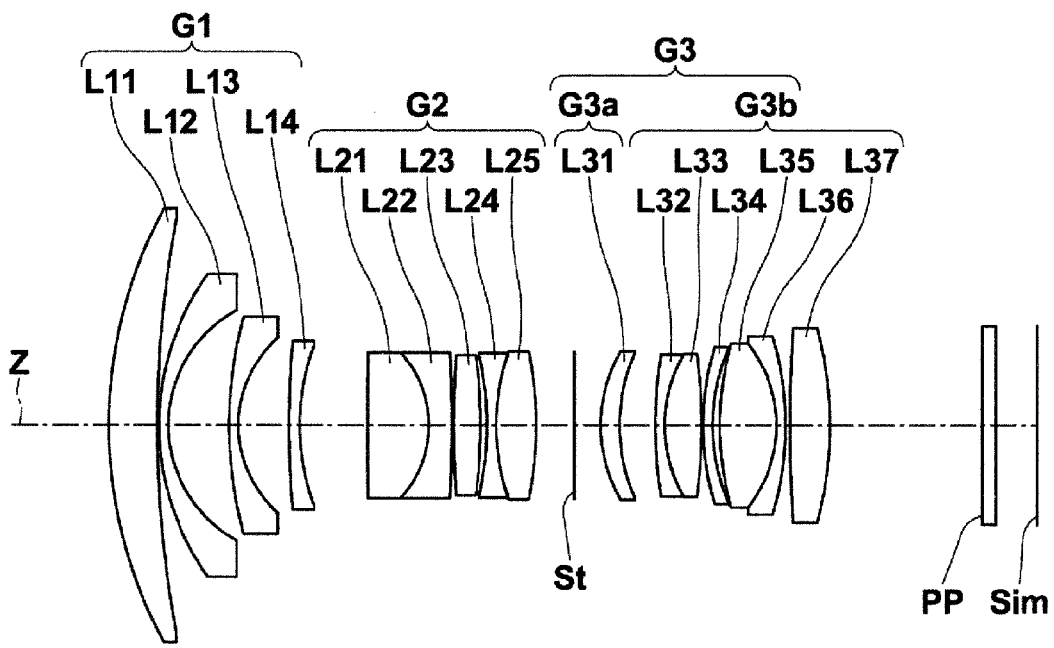
FIG.4  EXAMPLE 3

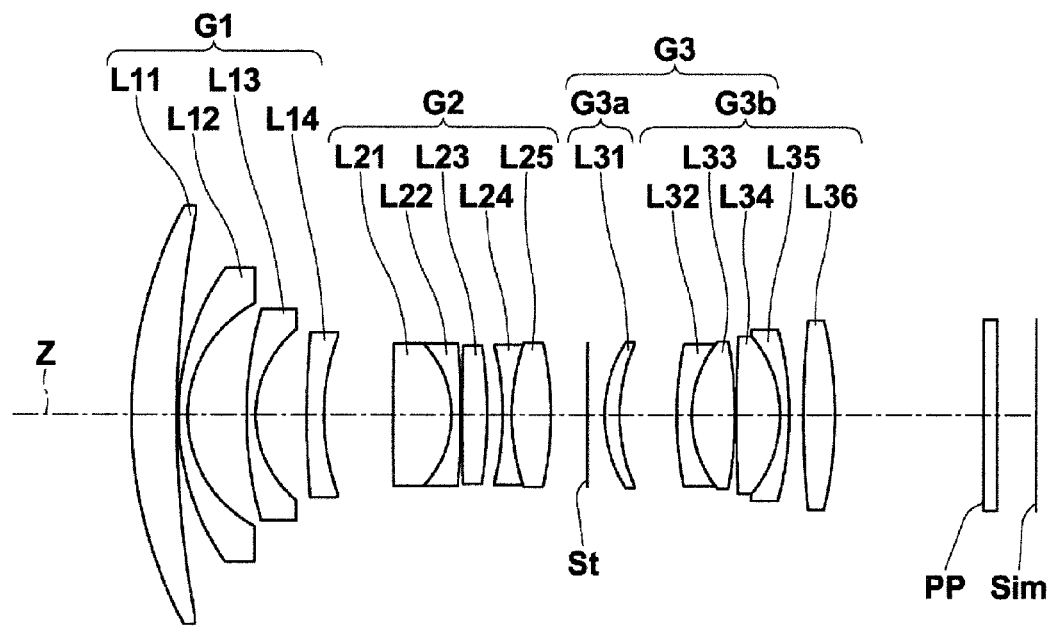
FIG.5  EXAMPLE 4
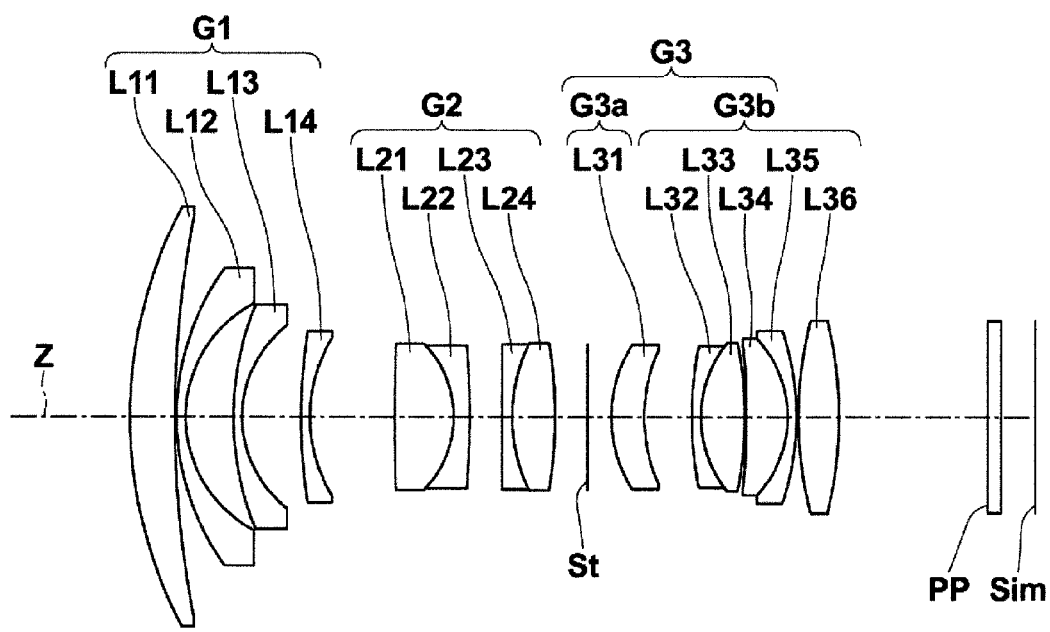
FIG.6  EXAMPLE 5

WIDE ANGLE LENS AND IMAGING APPARATUS

CROSS-REFERENCE TO RELATED APPLICATIONS

This application is a Continuation of PCT International Application No. PCT/JP2013/003925 filed on Jun. 24, 2013, which claims priority under 35 U.S.C. §119(a) to Japanese Patent Application No. 2012-151318 filed on Jul. 5, 2012. Each of the above applications is hereby expressly incorporated by reference, in its entirety, into the present application.

BACKGROUND OF THE INVENTION

1. Field of the Invention

The present invention relates to a retrofocus-type wide angle lens and an imaging apparatus. In particular, the present invention relates to a wide angle lens used in electronic cameras, such as a digital camera, a camera for broadcasting, a camera for surveillance and a camera for film making, and an imaging apparatus including the wide angle lens.

2. Description of the Related Art

As a wide angle lens used in an imaging apparatus, such as a video camera and an electronic still camera, which uses an imaging device, such as a CCD (Charge Couple Device) and a CMOS (Complementary Metal Oxide Simiconductor), as a recording medium, various retrofocus-type wide angle lenses have been proposed, for example, in Japanese Unexamined Patent Publication No. 8(1996)-094926 (Patent Document 1) and Japanese Unexamined Patent Publication No. 2004-219610 (Patent Document 2).

SUMMARY OF THE INVENTION

However, both of the lenses proposed in Patent Documents 1 and 2 have drawbacks that F-numbers are about 3.6, which means slow lenses.

In view of the aforementioned circumstances, it is an object of the present invention to provide a fast retrofocus-type wide angle lens in which various aberrations are excellently corrected, and an imaging apparatus including the lens.

A retrofocus-type wide angle lens of the present invention consists of a first lens group having negative refractive power as a whole, a second lens group having positive refractive power as a whole, and a third lens group having positive refractive power as a whole in this order from an object side. A stop is included between the second lens group and the third lens group. The first lens group consists of a positive meniscus lens with its convex surface facing the object side and three negative meniscus lenses, each with its convex surface facing the object side, in this order from the object side. The second lens group includes at least two cemented lenses of a 21st cemented lens and a 22nd cemented lens. The third lens group consists of a 3a-th lens group consisting of a positive meniscus lens with its convex surface facing the object side and a 3b-th lens group that includes at least two cemented lenses of a 31st cemented lens and a 32nd cemented lens and has positive refractive power as a whole, in this order from the object side.

Here, it is desirable that the 3b-th lens group includes a lens having positive refractive power most toward an image side.

It is desirable that the 3b-th lens group includes the 31st cemented lens, a cemented surface of which is convex toward the object side, and the 32nd cemented lens, a cemented surface of which is convex toward an image side, in this order from the object side.

It is desirable that the second lens group includes the 21st cemented lens, a cemented surface of which is convex toward an image side, and the 22nd cemented lens, a cemented surface of which is convex toward the object side, in this order from the object side.

It is desirable that focusing is performed by moving the 3b-th lens group in the direction of an optical axis.

Further, it is desirable that the following conditional expression is satisfied:

$$-1.5 < f/f1 < -0.7 \quad (1),\text{ where}$$

f: a focal length of an entire system, and
f1: a focal length of the first lens group.

In this case, it is more desirable that the following conditional expression is satisfied:

$$-1.2 < f/f1 < -0.8 \quad (1a).$$

Further, it is desirable that the following conditional expression is satisfied:

$$0.2 < f/f3b < 0.5 \quad (2),\text{ where}$$

f: a focal length of an entire system, and
f3b: a focal length of the 3b-th lens group.

In this case, it is more desirable that the following conditional expression is satisfied:

$$0.3 < f/f3b < 0.45 \quad (2a).$$

Further, it is desirable that the following conditional expression is satisfied:

$$0.2 < f/f2 < 0.5 \quad (3),\text{ where}$$

f: a focal length of an entire system, and
f2: a focal length of the second lens group.

In this case, it is more desirable that the following conditional expression is satisfied:

$$0.25 < f/f2 < 0.45 \quad (3a).$$

Further, it is desirable that the following conditional expression is satisfied:

$$-0.4 < (R3a1-R3a2)/(R3a1+R3a2) < 0.1 \quad (4),\text{ where}$$

R3a1: a curvature radius of an object-side surface of the positive meniscus lens in the 3a-th lens group, and
R3a2: a curvature radius of an image-side surface of the positive meniscus lens in the 3a-th lens group.

In this case, it is more desirable that the following conditional expression is satisfied:

$$-0.25 < (R3a1-R3a2)/(R3a1+R3a2) < 0 \quad (4a).$$

It is desirable that the second lens group consists of the 21st cemented lens, a lens 2p having positive refractive power and the 22nd cemented lens in this order from the object side.

In this case, it is desirable that the lens 2p satisfies the following conditional expression:

$$vd2p < 30 \quad (5),\text{ where}$$

vd2p: an Abbe number of the lens 2p.

Further, it is desirable that the 3b-th lens group consists of the 31st cemented lens, a negative meniscus lens with its concave surface facing an image side, the 32nd cemented lens and a lens having positive refractive power in this order from the object side.

An imaging apparatus of the present invention includes the aforementioned wide angle lens of the present invention.

A retrofocus-type wide angle lens of the present invention consists of a first lens group having negative refractive power as a whole, a second lens group having positive refractive power as a whole, and a third lens group having positive refractive power as a whole in this order from an object side. Further, the first lens group consists of a positive meniscus lens with its convex surface facing the object side and three negative meniscus lenses, each with its convex surface facing the object side, in this order from the object side. Further, the second lens group includes at least two cemented lenses of a 21st cemented lens and a 22nd cemented lens. The third lens group consists of a 3a-th lens group consisting of a positive meniscus lens with its convex surface facing the object side and a 3b-th lens group that includes at least two cemented lenses of a 31st cemented lens and a 32nd cemented lens and has positive refractive power as a whole, in this order from the object side. Therefore, excellent correction of various aberrations is possible while an F-number is about 1.9, which means a fast lens, and the lens is a wide angle lens having an angle of view of about 85 degrees.

Further, the imaging apparatus of the present invention includes the wide angle lens of the present invention. Therefore, bright high-quality video images are obtainable.

BRIEF DESCRIPTION OF THE DRAWINGS

FIG. 2 is a diagram illustrating optical paths of the wide angle lens;

FIG. 3 is a cross section illustrating the lens structure of a wide angle lens in Example 2 of the present invention;

FIG. 4 is a cross section illustrating the lens structure of a wide angle lens in Example 3 of the present invention;

FIG. 5 is a cross section illustrating the lens structure of a wide angle lens in Example 4 of the present invention;

FIG. 6 is a cross section illustrating the lens structure of a wide angle lens in Example 5 of the present invention;

DESCRIPTION OF THE PREFERRED EMBODIMENTS

Figure 1:
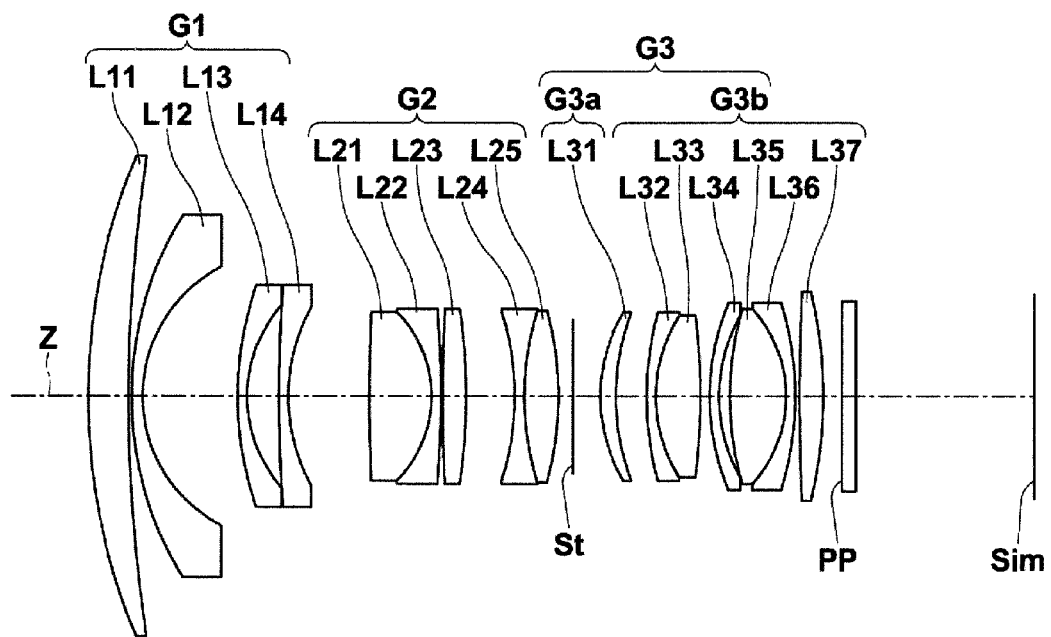
FIG. 1 is a cross section illustrating the lens structure of a wide angle lens according to an embodiment of the present invention (also Example 1)

Hereinafter, embodiments of the present invention will be described in detail with reference to drawings. FIG. 1 is a cross section illustrating the lens structure of a wide angle lens according to an embodiment of the present invention (also Example 1). FIG. 2 is a diagram illustrating optical paths of the wide angle lens. The example of structure illustrated in FIG. 1 and FIG. 2 is also the structure of a wide angle lens in Example 1, which will be described later. In FIG. 1 and FIG. 2, the left side is an object side, and the right side is an image side. In FIG. 2, axial rays LF1 from an object point at infinite distance and off-axial rays LF2 at angle ω of view are also illustrated.

This wide angle lens consists of first lens group G1 having negative refractive power, as a whole, second lens group G2 having positive refractive power, as a whole, aperture stop St, and third lens group G3 having positive refractive power, as a whole, along optical axis Z in this order from the object side. Here, aperture stop St illustrated in FIG. 1 and FIG. 2 does not necessarily represent the size nor the shape of aperture stop, but a position on optical axis Z.

When this wide angle lens is applied to an imaging apparatus, it is desirable to arrange a cover glass, a prism, and various filters, such as an infrared ray cut filter and a low-pass filter, between an optical system and image plane Sim based on the structure of a camera on which the lens is mounted. Therefore, FIG. 1 illustrates an example in which parallel-flat-plate-shaped optical member PP, which is assumed to be such elements, is arranged between third lens group G3 and image plane Sim.

First lens group G1 consists of positive meniscus lens L11 with its convex surface facing the object side and three negative meniscus lenses L12, L13 and L14, each with its convex surface facing the object side, in this order from the object side.

Second lens group G2 includes at least two cemented lenses of a 21st cemented lens consisting of lens L21 and lens L22 and a 22nd cemented lens consisting of lens L24 and lens L25.

Third lens group G3 consists of 3a-th lens group G3a consisting of positive meniscus lens L31 with its convex surface facing the object side and 3b-th lens group G3b that includes at least two cemented lenses of a 31st cemented lens consisting of lens L32 and lens L33 and a 32nd cemented lens consisting of lens L35 and lens L36 and has positive refractive power as a whole, in this order from the object side. A retrofocus-type lens consisting of a front group having negative refractive power and a rear group having positive refractive power in this order from the object side is appropriate to widen an angle of view. However, since the positive refractive power of the rear group becomes strong, there has been a problem that it is difficult to manage to achieve a small F-number. In the present invention, the rear group is divided into two parts, i.e., second lens group G2 having positive refractive power and third lens group G3 having positive refractive power, and thereby the refractive power is distributed to the two parts. Accordingly, a small F-number is achieved.

In first lens group G1, positive meniscus lens L11 with its convex surface facing the object side is arranged most toward the object side. The arrangement is advantageous to reducing a total length, reducing an effective diameter and correcting distortion and a lateral chromatic aberration. Further, negative refractive that follows positive meniscus lens L11 is distributed to three negative meniscus lenses L12, L13 and L14, each with its convex surface facing the object side. The structure is advantageous to correction of distortion and a spherical aberration.

Further, when second lens group G2 includes at least two cemented lenses, the structure is advantageous to correction of a longitudinal chromatic aberration and a lateral chromatic aberration.

In third lens group G3, when 3a-th lens group G3a is positive meniscus lens L31 with its convex surface facing the object side, it is possible to cancel out an over-corrected spherical aberration that tends to be generated when chromatic aberrations are corrected in 3b-th lens group G3b.

Therefore, it becomes possible to easily achieve a small F-number. Further, when 3b-th lens group G3b includes at least two cemented lenses, it is possible to correct a longitudinal chromatic aberration without generating high-order chromatic aberrations.

Here, it is desirable that 3b-th lens group G3b includes lens L37 that has positive refractive power and is arranged most toward the image side. This structure is advantageous to reducing a spherical aberration to achieve a small F-number. Further, it is possible to prevent an angle at which rays at a peripheral angle of view enter an image plane from becoming too large.

Further, it is desirable that 3b-th lens group G3b includes the 31st cemented lens, the cemented surface of which is convex toward the object side, and the 32nd cemented lens, the cemented surface of which is convex toward the image side, in this order from the object side. When the cemented surface of the 31st cemented lens is convex toward the object side, it is possible to reduce a high-order spherical aberration and a difference in spherical aberrations according to wavelengths. In the 32nd cemented lens, the height of axial marginal rays is lower than the height of the axial marginal rays in the 31st cemented lens, and the height of off-axial rays is higher than the height of the off-axial rays in the 31st cemented lens. Therefore, the magnitude of effects on off-axial aberrations is greater than the magnitude of effects on a spherical aberration. Hence, when the cemented surface of the 32nd cemented lens is convex toward the image side, the structure is advantageous to correction of astigmatism.

It is desirable that second lens group G2 includes the 21st cemented lens, the cemented surface of which is convex toward the image side, and the 22nd cemented lens, the cemented surface of which is convex toward the object side, in this order from the object side. When the cemented surface of the 21st cemented lens is convex toward the image side, a difference in spherical aberrations according to wavelengths does not tend to be generated. Further, when the cemented surface of the 22nd cemented lens is convex toward the object side, the structure is advantageous to correction of a lateral chromatic aberration.

Further, it is desirable that focusing is performed by moving the 3b-th lens group in the direction of an optical axis. When focusing is performed in such a manner, it is possible to reduce the weight of a group that moves during focusing, compared with a case of moving the whole third lens group G3, while the optical system has a small F-number. Therefore, it is possible to suppress fluctuations of a spherical aberration and curvature of field due to focusing.

Further, it is desirable that the following conditional expression (1) is satisfied. If the value is lower than the lower limit of conditional expression (1), the structure is disadvantageous to correction of distortion and a lateral chromatic aberration. On the other hand, if the value exceeds the upper limit of conditional expression (1), the structure is disadvantageous to widening an angle of view. Further, it becomes difficult to secure a backfocus. When the following conditional expression (1a) is satisfied, more excellent characteristics are achievable.

$$-1.5 < f/f1 < -0.7 \quad (1); \text{ and}$$

$$-1.2 < f/f1 < -0.8 \quad (1a), \text{ where}$$

f: a focal length of an entire system, and
f1: a focal length of the first lens group.

Further, it is desirable that the following conditional expression (2) is satisfied. If the value is lower than the lower limit of conditional expression (2), an amount of movement due to focusing becomes too large, and the structure is disadvantageous to increasing the speed of focusing. On the other hand, if the value exceeds the upper limit of conditional expression (2), fluctuations of a spherical aberration and curvature of field due to focusing become large. When the following conditional expression (2a) is satisfied, more excellent characteristics are achievable.

$$0.2 < f/f3b < 0.5 \quad (2); \text{ and}$$

$$0.3 < f/f3b < 0.45 \quad (2a), \text{ where}$$

f: a focal length of an entire system, and
f3b: a focal length of the 3b-th lens group.

Further, it is desirable that the following conditional expression (3) is satisfied. When the value is lower than the lower limit of conditional expression (3), the structure is disadvantageous to correction of a spherical aberration and a lateral chromatic aberration. On the other hand, if the value exceeds the upper limit of conditional expression (3), it becomes difficult to secure a backfocus. When the following conditional expression (3a) is satisfied, more excellent characteristics are achievable.

$$0.2 < f/f2 < 0.5 \quad (3); \text{ and}$$

$$0.25 < f/f2 < 0.45 \quad (3a), \text{ where}$$

f: a focal length of an entire system, and
f2: a focal length of the second lens group.

It is desirable that the following conditional expression (4) is satisfied. If the value is lower than the lower limit of conditional expression (4), the structure is disadvantageous to correction of a spherical aberration. On the other hand, if the value exceeds the upper limit of conditional expression (4), a high-order spherical aberration tends to be generated. When the following conditional expression (4a) is satisfied, more excellent characteristics are achievable.

$$-0.4 < (R3a1 - R3a2)/(R3a1 + R3a2) < 0.1 \quad (4); \text{ and}$$

$$-0.25 < (R3a1 - R3a2)/(R3a1 + R3a2) < 0 \quad (4a), \text{ where}$$

R3a1: a curvature radius of an object-side surface of the positive meniscus lens in the 3a-th lens group, and
R3a2: a curvature radius of an image-side surface of the positive meniscus lens in the 3a-th lens group.

Further, when aperture stop St is included between second lens group G2 and third lens group G3, it is possible to balance the effective diameter of a lens most toward the object side and the effective diameter of a lens most toward the image side. Therefore, it is possible to reduce the size of the entire lens system.

Further, it is desirable that second lens group G2 consists of the 21st cemented lens consisting of lens L21 and lens L22, lens L23 (lens 2p in the claims) having positive refractive power and the 22nd cemented lens consisting of lens L24 and lens L25 in this order from the object side. When the lens having positive refractive power is arranged between the two cemented lenses in second lens group G2, it is possible to suppress a spherical aberration, and to achieve a small F-number. When lens L23 (lens 2p in the claims) having positive refractive power is a biconvex lens, more remarkable effects are achievable.

In this case, it is desirable that the material of lens L23 (lens 2p in the claims) having positive refractive power satisfies the following conditional expression (5). When the material of lens L23 is within the range defined by conditional expression (5), it is possible to excellently correct a lateral chromatic aberration.

$$vd2p < 30 \quad (5), \text{ where}$$

vd2p: an Abbe number of the lens 2p.

Further, it is desirable that 3b-th lens group G3b consists of the 31st cemented lens consisting of lens L32 and L33, negative meniscus lens L34 with its concave surface facing the image side, the 32nd cemented lens consisting of lens L35 and L36, and lens L37 having positive refractive power in this order from the object side.

When negative meniscus lens L34 with its concave surface facing the image side is arranged between the two cemented lenses in 3b-th lens group G3b, it is possible to correct a longitudinal chromatic aberration while suppressing generation of spherical aberrations according to wavelengths.

In the wide angle lens of the present invention, it is desirable to use glass as a specific material arranged most toward the object side. Alternatively, transparent ceramic may be used.

When the wide angle lens of the present invention is used in tough environments, it is desirable that a multilayer coating for protection is applied. Further, an anti-reflection coating for reducing ghost light or the like during usage may be applied besides the coating for protection.

FIG. 1 and FIG. 2 illustrate an example in which optical member PP is arranged between the lens system and image plane Sim. Instead of arranging there various filters, such as a low-pass filter and a filter that cuts a specific wavelength band, the various filters may be arranged between lenses. Alternatively, a coating having a similar action to that of the various filters may be applied to a lens surface of one of the lenses.

Next, numerical value examples of the wide angle lens of the present invention will be described. Numerical values in the following tables 1 through 11 and aberration diagrams illustrated in FIGS. 7 through 11 are normalized so that the focal length of the entire system when the lens system is focused on an object at infinity is 1.0.

First, a wide angle lens in Example 1 will be described. FIG. 1 is a cross section illustrating the lens structure of the wide angle lens in Example 1. Optical member PP is also illustrated in FIG. 1 and FIGS. 3 through 6 corresponding to Examples 2 through 5, which will be described later. Further, the left side is the object side, and the right side is the image side. Illustrated aperture stop St does not necessarily represent the size nor the shape of aperture stop, but a position on optical axis Z.

The wide angle lens in Example 1 consists of first lens group G1 having negative refractive power as a whole, second lens group G2 having positive refractive power as a whole, and third lens group G3 having positive refractive power as a whole in this order from the object side.

First lens group G1 consists of positive meniscus lens L11 with its convex surface facing the object side and three negative meniscus lenses L12, L13 and L14, each with its convex surface facing the object side, in this order from the object side.

Second lens group G2 consists of a cemented lens consisting of biconvex lens L21 and negative meniscus lens L22, and the cemented surface of which is convex toward the image side, biconvex lens L23, and a cemented lens consisting of biconcave lens L24 and biconvex lens L25, and the cemented surface of which is convex toward the object side, in this order from the object side.

Third lens group G3 consists of 3a-th lens group G3a consisting of positive meniscus lens L31 with its convex surface facing the object side, and which is arranged most toward the object side, and 3b-th lens group G3b. 3b-th lens group G3b consists of a cemented lens consisting of negative meniscus lens L32 and biconvex lens L33, and the cemented surface of which is convex toward the object side, negative meniscus lens L34 with its concave surface facing the image side, and a cemented lens consisting of biconvex lens L35 and negative meniscus lens L36, and the cemented surface of which is convex toward the image side, and biconvex lens L37 in this order from the object side.

Table 1 shows basic lens data of the wide angle lens in Example 1, and Table 2 shows data about specification of the wide angle lens in Example 1.

Next, the meanings of signs in the tables will be described by using Example 1 as an example. The meanings of signs in Examples 2 through 5 are basically similar to Example 1.

In the lens data of Table 1, a column of Si shows the surface number of i-th surface (i=1, 2, 3 . . . ) that sequentially increases toward the image side when a most object-side surface of composition elements is the first surface. A column of Ri shows the curvature radius of the i-th surface, and a column of Di shows a surface distance on optical axis Z between an i-th surface and an (i+1)th surface. Further, a column of Ndj shows a refractive index for d-line (wavelength is 587.6 nm) of a medium between the i-th surface and the (i+1)th surface. A column of vdj shows an Abbe number of a j-th optical element (j=1, 2, 3 . . . ) with respect to d-line when a most object-side optical element is the first optical element and j sequentially increases toward the image side. A column of ΔθgFj shows anomalous dispersion characteristics of the j-th optical element (j=1, 2, 3 . . . ) when the most object-side optical element is the first optical element and j sequentially increases toward the image side.

Here, the sign of a curvature radius is positive when a surface shape is convex toward the object side, and negative when a surface shape is convex toward the image side. The basic lens data show also aperture stop St and optical member PP. In the column of surface numbers, the term "(STOP)" is written together with the surface number of a surface corresponding to aperture stop St.

Data about specification in Table 2 show focal length f', backfocus Bf', F-number Fno., and full angle 2 ω of view.

In the basic lens data and the data about specification, degrees are used as the unit of angles. However, no unit is present for the other values because the values are normalized.

TABLE 1

EXAMPLE 1·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | ΔθgFj (ANOMALOUS DISPERSION CHARACTERISTICS) |
|---|---|---|---|---|---|
| 1 | 5.542847 | 0.3612 | 1.77250 | 49.60 | |
| 2 | 14.098487 | 0.0278 | | | |
| 3 | 3.071206 | 0.1000 | 1.61800 | 63.33 | 0.0051 |
| 4 | 1.301834 | 0.8447 | | | |
| 5 | 3.061957 | 0.0834 | 1.80809 | 22.76 | 0.0261 |
| 6 | 1.221411 | 0.2845 | | | |

TABLE 1-continued

EXAMPLE 1·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 7 | 12.970118 | 0.0834 | 1.49700 | 81.54 | 0.0280 |
| 8 | 1.644818 | 0.7280 | | | |
| 9 | 16.630086 | 0.5563 | 1.80610 | 40.92 | |
| 10 | −1.056614 | 0.0828 | 1.71736 | 29.52 | |
| 11 | −9.734791 | 0.0167 | | | |
| 12 | 19.045622 | 0.2112 | 1.84661 | 23.78 | |
| 13 | −5.074320 | 0.4357 | | | |
| 14 | −2.492015 | 0.0840 | 1.83481 | 42.73 | |
| 15 | 2.492015 | 0.3051 | 1.84139 | 24.56 | |
| 16 | −2.981717 | 0.1306 | | | |
| 17(STOP) | ∞ | 0.2417 | | | |
| 18 | 1.486442 | 0.1389 | 1.51633 | 64.14 | |
| 19 | 2.112515 | 0.2734 | | | |
| 20 | 2.829996 | 0.0840 | 1.80518 | 25.42 | |
| 21 | 1.359432 | 0.3996 | 1.49700 | 81.54 | |
| 22 | −5.901987 | 0.0834 | | | |
| 23 | 2.146761 | 0.0834 | 1.80518 | 25.42 | |
| 24 | 1.443430 | 0.0995 | | | |
| 25 | 2.797351 | 0.5002 | 1.49700 | 81.54 | |
| 26 | −1.165593 | 0.0834 | 1.80518 | 25.42 | |
| 27 | −2.759720 | 0.0378 | | | |
| 28 | 24.625244 | 0.2112 | 1.72342 | 37.95 | |
| 29 | −3.935789 | 0.1667 | | | |
| 30 | ∞ | 0.1278 | 1.51680 | 64.20 | |
| 31 | ∞ | 1.5928 | | | |

TABLE 2

EXAMPLE 1·SPECIFICATION (d-LINE)

| | |
|---|---|
| f | 1.00 |
| Bf | 1.84 |
| Fno. | 1.90 |
| 2ω[°] | 85.0 |

Figure 7:
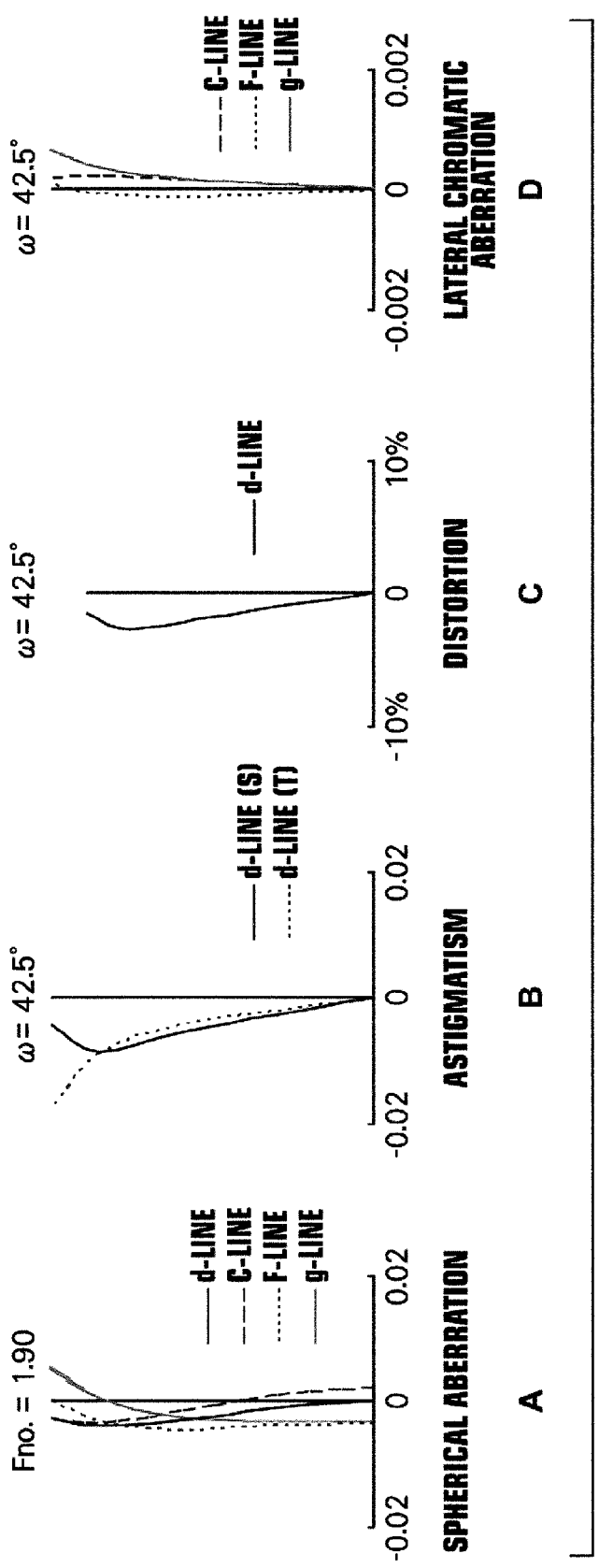
FIG. 7 is a diagram illustrating aberrations of the wide angle lens in Example 1 of the present invention Sections A through D.

FIG. 7, Sections A through D are aberration diagrams of the wide angle lens in Example 1. FIG. 7, Sections A through D illustrate a spherical aberration, astigmatism, distortion and a lateral chromatic aberration, respectively. Next, the meanings of the aberration diagrams will be described by using the aberration diagrams in Example 1, as an example. The meanings of aberration diagrams in Examples 2 through 5 are basically similar to Example 1.

The aberration diagrams of a spherical aberration, astigmatism and distortion illustrate aberrations when d-line (wavelength is 587.6 nm) is a reference wavelength. The aberration diagram of the spherical aberration illustrates aberrations for d-line (wavelength is 587.6 nm), C-line (wavelength is 656.3 nm), F-line (wavelength is 486.1 nm) and g-line (wavelength is 435.8 nm) by a solid line, a long broken line, a short broken line and a dotted line, respectively. The aberration diagram of the astigmatism illustrates aberrations for a sagittal direction and a tangential direction by a solid line and a broken line, respectively. The aberration diagram of the lateral chromatic aberration illustrates aberrations for C-line (wavelength is 656.3 nm), F-line (wavelength is 486.1 nm) and g-line (wavelength is 435.8 nm) by a long broken line, a short broken line and a dotted line, respectively. In the aberration diagram of the spherical aberration, Fno. means an F-number. In the other diagrams, ω represents a half angle of view.

Next, a wide angle lens in Example 2 will be described. FIG. 3 is a cross section illustrating the lens structure of the wide angle lens in Example 2. The lens structure of this example is similar to that of Example 1.

Figure 8:
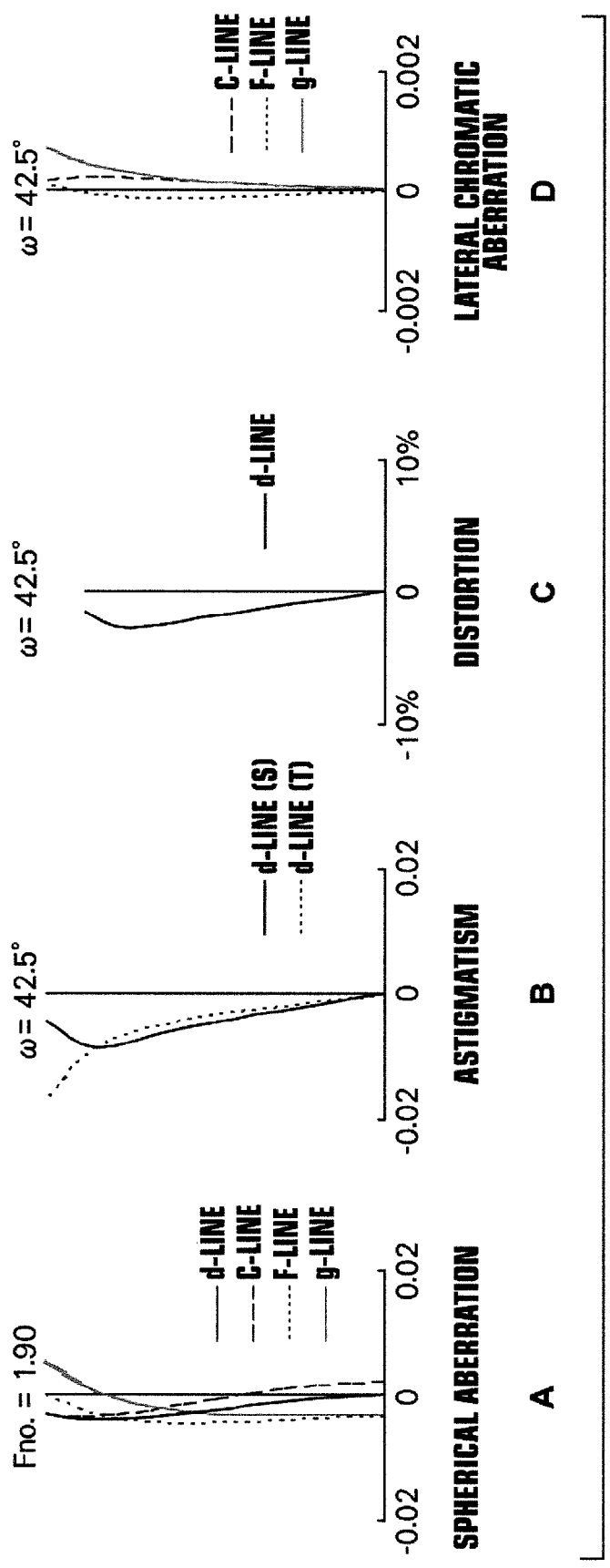
FIG. 8 is a diagram illustrating aberrations of the wide angle lens in Example 2 of the present invention Sections A through D.

Table 3 shows basic lens data of the wide angle lens in Example 2, and Table 4 shows data about specification of the wide angle lens in Example 2. FIG. 8, Sections A through D are aberration diagrams of the wide angle lens in Example 2.

TABLE 3

EXAMPLE 2·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 5.556584 | 0.3611 | 1.77250 | 49.60 | |
| 2 | 14.140638 | 0.0278 | | | |
| 3 | 3.052426 | 0.1000 | 1.61800 | 63.33 | 0.0051 |
| 4 | 1.301315 | 0.8444 | | | |
| 5 | 3.095693 | 0.0833 | 1.80809 | 22.76 | 0.0261 |
| 6 | 1.218814 | 0.2866 | | | |
| 7 | 13.671105 | 0.0833 | 1.49700 | 81.54 | 0.0280 |

TABLE 3-continued

EXAMPLE 2·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 8 | 1.678148 | 0.7411 | | | |
| 9 | 18.860770 | 0.5555 | 1.80610 | 40.92 | |
| 10 | −1.059748 | 0.0833 | 1.71736 | 29.52 | |
| 11 | −8.377437 | 0.0167 | | | |
| 12 | 16.673103 | 0.2111 | 1.84661 | 23.78 | |
| 13 | −5.345223 | 0.4244 | | | |
| 14 | −2.508076 | 0.0833 | 1.83481 | 42.73 | |
| 15 | 2.508076 | 0.3055 | 1.84139 | 24.56 | |
| 16 | −3.005263 | 0.1305 | | | |
| 17(STOP) | ∞ | 0.2411 | | | |
| 18 | 1.462289 | 0.1389 | 1.51633 | 64.14 | |
| 19 | 2.029938 | 0.2795 | | | |
| 20 | 2.872447 | 0.0833 | 1.80518 | 25.42 | |
| 21 | 1.345336 | 0.4000 | 1.49700 | 81.54 | |
| 22 | −5.805069 | 0.0744 | | | |
| 23 | 2.145907 | 0.0833 | 1.80518 | 25.42 | |
| 24 | 1.454239 | 0.0989 | | | |
| 25 | 2.828805 | 0.5000 | 1.49700 | 81.54 | |
| 26 | −1.167795 | 0.0833 | 1.80518 | 25.42 | |
| 27 | −2.751227 | 0.0378 | | | |
| 28 | 27.543948 | 0.2111 | 1.72342 | 37.95 | |
| 29 | −3.858300 | 1.3888 | | | |
| 30 | ∞ | 0.1278 | 1.51680 | 64.20 | |
| 31 | ∞ | 0.3709 | | | |

TABLE 4

EXAMPLE 2·SPECIFICATION (d-LINE)

| f | 1.00 |
|---|---|
| Bf | 1.84 |
| Fno. | 1.89 |
| 2ω[°] | 85.0 |

Next, a wide angle lens in Example 3 will be described. FIG. 4 is a cross section illustrating the lens structure of the wide angle lens in Example 3. The lens structure of this example is similar to that of Example 1.

Figure 9:
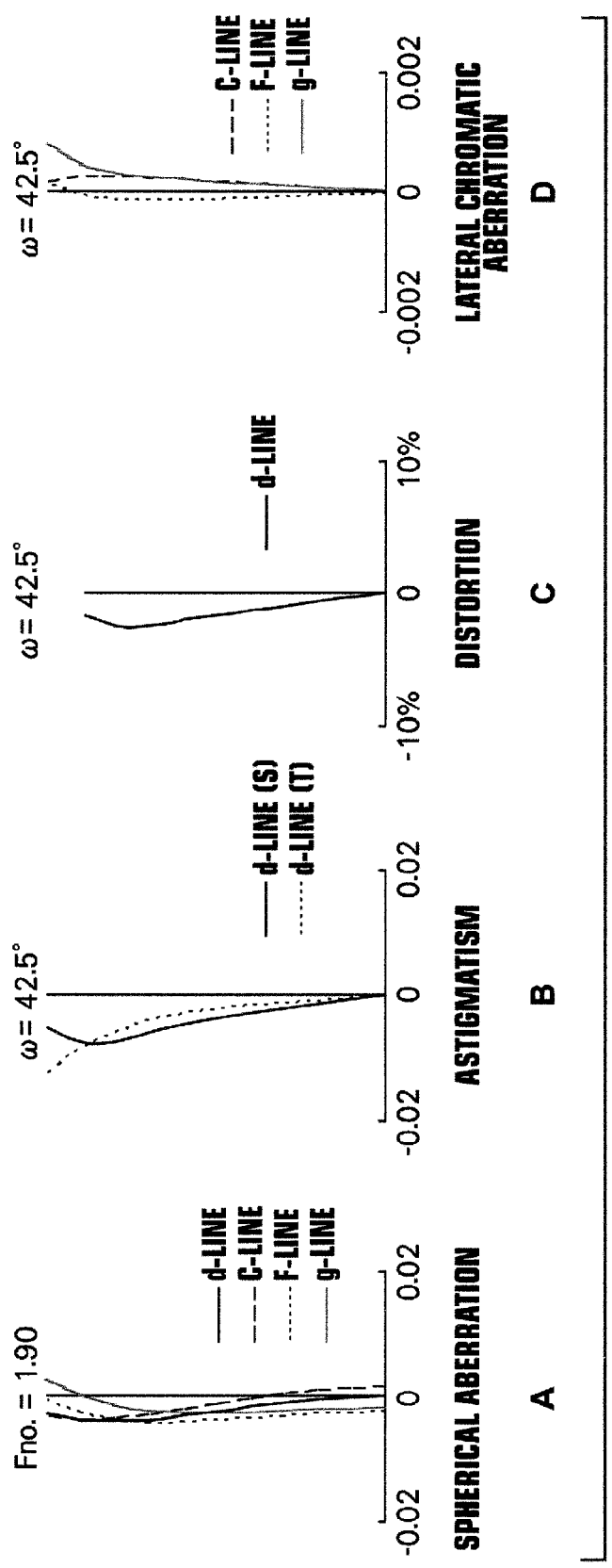
FIG. 9 is a diagram illustrating aberrations of the wide angle lens in Example 3 of the present invention Sections A through D.

Table 5 shows basic lens data of the wide angle lens in Example 3, and Table 6 shows data about specification of the wide angle lens in Example 3. FIG. 9, Sections A through D are aberration diagrams of the wide angle lens in Example 3.

TABLE 5

EXAMPLE 3·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 4.138694 | 0.4391 | 1.77250 | 49.60 | |
| 2 | 10.378872 | 0.0167 | | | |
| 3 | 2.370282 | 0.0834 | 1.61800 | 63.33 | 0.0051 |
| 4 | 1.195041 | 0.5558 | | | |
| 5 | 3.779666 | 0.0834 | 1.80809 | 22.76 | 0.0261 |
| 6 | 1.056083 | 0.4675 | | | |
| 7 | 9.831900 | 0.0945 | 1.49700 | 81.54 | 0.0280 |
| 8 | 2.093741 | 0.6148 | | | |
| 9 | 27.791658 | 0.5558 | 1.80610 | 40.92 | |
| 10 | −0.995985 | 0.2112 | 1.71736 | 29.52 | |
| 11 | −11.978471 | 0.0167 | | | |
| 12 | 9.186432 | 0.2446 | 1.84661 | 23.78 | |
| 13 | −4.986438 | 0.0610 | | | |
| 14 | −2.779166 | 0.0834 | 1.83481 | 42.73 | |
| 15 | 2.064869 | 0.3668 | 1.84139 | 24.56 | |
| 16 | −3.277541 | 0.3474 | | | |
| 17(STOP) | ∞ | 0.2373 | | | |
| 18 | 1.348934 | 0.1723 | 1.51633 | 64.14 | |
| 19 | 1.667469 | 0.3263 | | | |
| 20 | 4.166249 | 0.0834 | 1.80518 | 25.42 | |
| 21 | 1.308194 | 0.3391 | 1.49700 | 81.54 | |
| 22 | −4.948323 | 0.0167 | | | |
| 23 | 2.586251 | 0.0834 | 1.80518 | 25.42 | |

TABLE 5-continued

EXAMPLE 3·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 24 | 1.772978 | 0.0667 | | | |
| 25 | 2.783511 | 0.5169 | 1.49700 | 81.54 | |
| 26 | −1.199272 | 0.0834 | 1.80518 | 25.42 | |
| 27 | −2.830583 | 0.0395 | | | |
| 28 | 12.978024 | 0.3613 | 1.72342 | 37.95 | |
| 29 | −3.472502 | 1.3896 | | | |
| 30 | ∞ | 0.1278 | 1.51680 | 64.20 | |
| 31 | ∞ | 0.3756 | | | |

TABLE 6

EXAMPLE 3·SPECIFICATION (d-LINE)

| | |
|---|---|
| f | 1.00 |
| Bf | 1.85 |
| Fno. | 1.90 |
| 2ω[°] | 85.0 |

Next, a wide angle lens in Example 4 will be described. FIG. 5 is a cross section illustrating the lens structure of the wide angle lens in Example 4.

The structure of the wide angle lens in Example 4 is similar to that of Example 1 except that third lens group G3 does not include the negative meniscus lens with its concave surface facing the image side (negative meniscus lens L34 in Example 1). The absolute value of the curvature radius of each of the cemented surfaces of the two cemented lenses in third lens group G3 is reduced to compensate for the effect of the negative meniscus lens.

Figure 10:
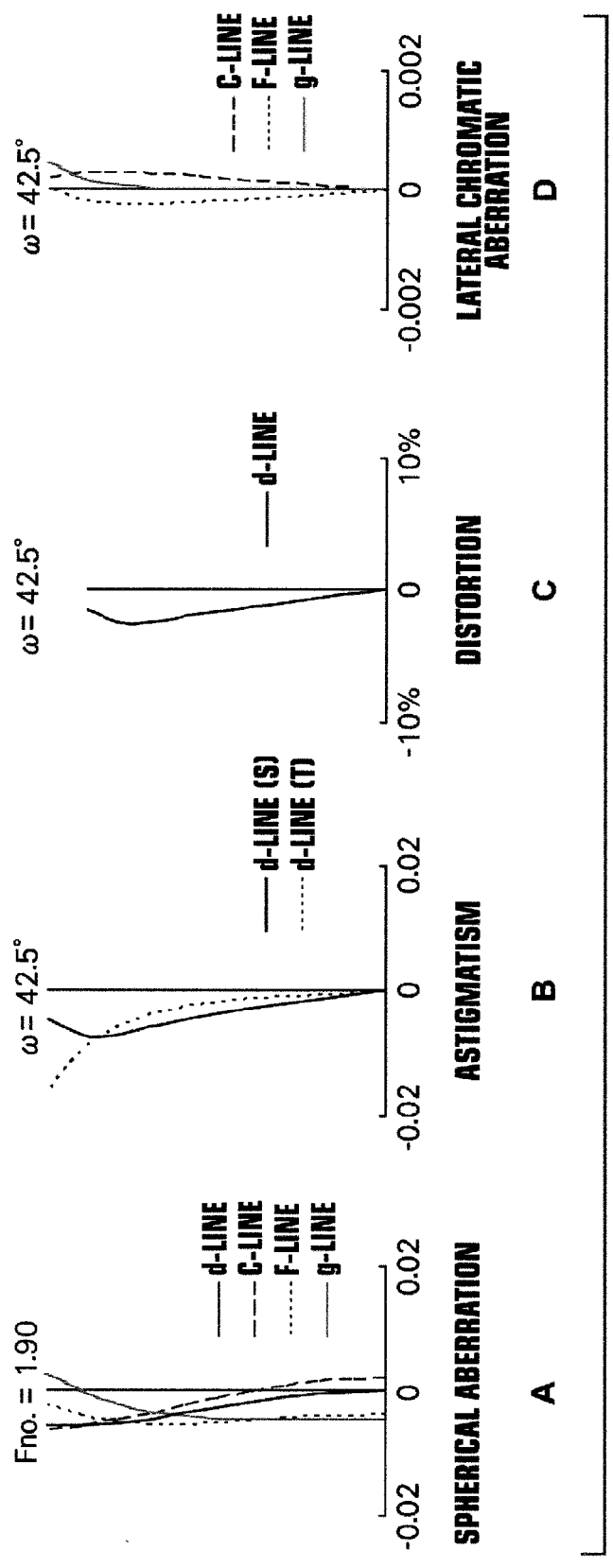
FIG. 10 is a diagram illustrating aberrations of the wide angle lens in Example 4 of the present invention Sections A through D.

Table 7 shows basic lens data of the wide angle lens in Example 4, and Table 8 shows data about specification of the wide angle lens in Example 4. FIG. 10, Sections A through D are aberration diagrams of the wide angle lens in Example 4.

TABLE 7

EXAMPLE 4·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 4.182362 | 0.4276 | 1.77250 | 49.60 | |
| 2 | 10.586104 | 0.0167 | | | |
| 3 | 2.412517 | 0.0833 | 1.61800 | 63.33 | 0.0051 |
| 4 | 1.194020 | 0.5554 | | | |
| 5 | 3.776434 | 0.0833 | 1.80809 | 22.76 | 0.0261 |
| 6 | 1.055180 | 0.4698 | | | |
| 7 | 8.581916 | 0.1611 | 1.49700 | 81.54 | 0.0280 |
| 8 | 2.155460 | 0.6420 | | | |
| 9 | 27.767899 | 0.5554 | 1.80610 | 40.92 | |
| 10 | −0.983390 | 0.0833 | 1.71736 | 29.52 | |
| 11 | −8.928522 | 0.0167 | | | |
| 12 | 38.523524 | 0.2277 | 1.84661 | 23.78 | |
| 13 | −4.432236 | 0.1444 | | | |
| 14 | −2.776790 | 0.0833 | 1.83481 | 42.73 | |
| 15 | 2.109248 | 0.3665 | 1.84139 | 24.56 | |
| 16 | −3.168768 | 0.3432 | | | |
| 17(STOP) | ∞ | 0.1583 | | | |
| 18 | 1.273911 | 0.1444 | 1.51633 | 64.14 | |
| 19 | 1.666074 | 0.5337 | | | |
| 20 | 3.540642 | 0.1388 | 1.80518 | 25.42 | |
| 21 | 1.139199 | 0.3999 | 1.49700 | 81.54 | |
| 22 | −3.771142 | 0.0167 | | | |
| 23 | 19.186606 | 0.4054 | 1.49700 | 81.54 | |
| 24 | −1.162003 | 0.0833 | 1.80518 | 25.42 | |
| 25 | −3.172618 | 0.1327 | | | |
| 26 | 9.153740 | 0.2999 | 1.72342 | 37.95 | |
| 27 | −3.753557 | 1.3884 | | | |
| 28 | ∞ | 0.1277 | 1.51680 | 64.20 | |
| 29 | ∞ | 0.3654 | | | |

TABLE 8

EXAMPLE 4·SPECIFICATION (d-LINE)

| | |
|---|---|
| f | 1.00 |
| Bf | 1.84 |
| Fno. | 1.90 |
| 2ω[°] | 85.0 |

Next, a wide angle lens in Example 5 will be described. FIG. 6 is a cross section illustrating the lens structure of the wide angle lens in Example 5.

The structure of the wide angle lens in Example 5 is similar to that of Example 4 except that a lens having positive refractive power (biconvex lens L23 in Example 1) is not included between the two cemented lenses in second lens group G2. The absolute value of the curvature radius of the cemented surface of the image-side cemented lens in second lens group G2 is reduced to compensate for the effect of the lens having positive refractive power, especially, the effect of correcting a lateral chromatic aberration.

Figure 11:
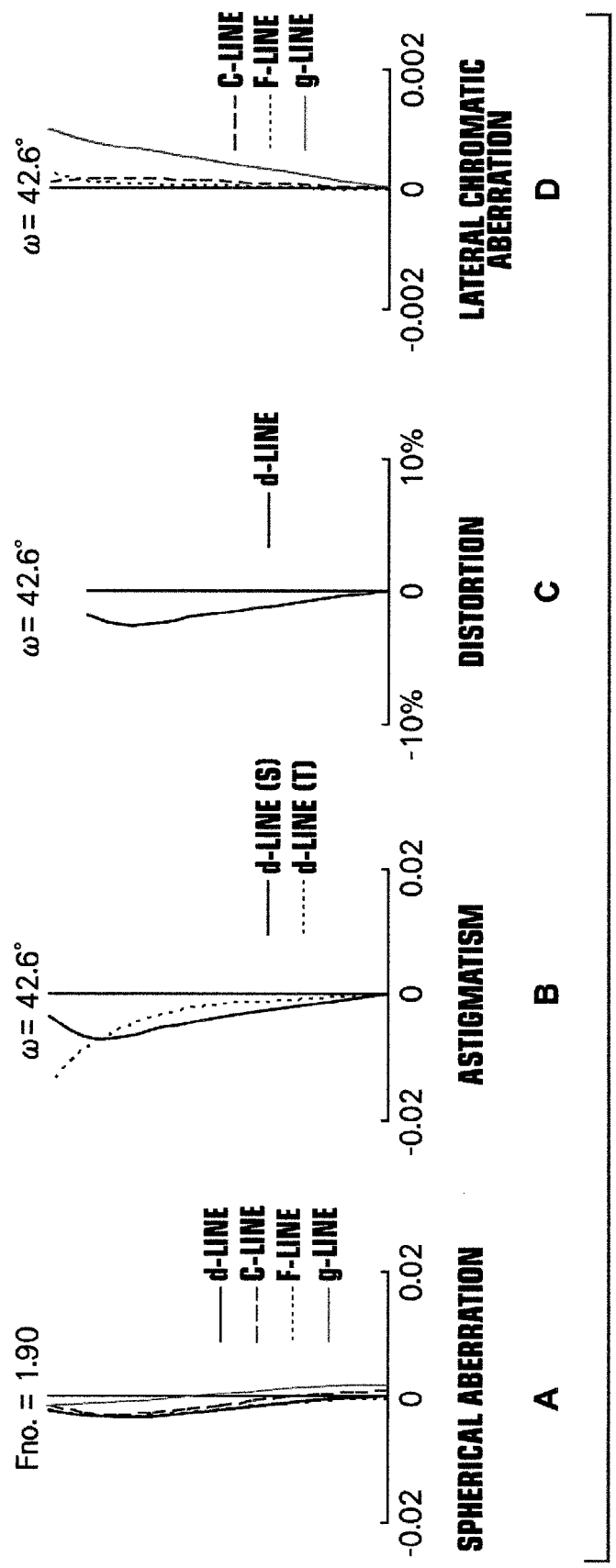
FIG. 11 is a diagram illustrating aberrations of the wide angle lens in Example 5 of the present invention Sections A through D.

Table 9 shows basic lens data of the wide angle lens in Example 5, and Table 10 shows data about specification of the wide angle lens in Example 5. FIG. 11, Sections A through D are aberration diagrams of the wide angle lens in Example 5.

TABLE 9

EXAMPLE 5·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 4.266790 | 0.4222 | 1.77250 | 49.60 | |
| 2 | 10.230017 | 0.0167 | | | |
| 3 | 2.427674 | 0.0833 | 1.61800 | 63.33 | 0.0051 |
| 4 | 1.219412 | 0.4488 | | | |
| 5 | 2.804126 | 0.0833 | 1.80809 | 22.76 | 0.0261 |
| 6 | 1.113167 | 0.5405 | | | |
| 7 | 5.301905 | 0.0833 | 1.49700 | 81.54 | 0.0280 |
| 8 | 1.448442 | 0.7905 | | | |
| 9 | 21.620563 | 0.5555 | 1.80610 | 40.92 | |
| 10 | −0.986576 | 0.1444 | 1.72825 | 28.46 | |
| 11 | −9.626014 | 0.3005 | | | |
| 12 | −239.036909 | 0.0944 | 1.80610 | 40.92 | |
| 13 | 1.595095 | 0.4000 | 1.84666 | 23.78 | |
| 14 | −4.443908 | 0.3055 | | | |
| 15(STOP) | ∞ | 0.2255 | | | |
| 16 | 1.303008 | 0.3055 | 1.48749 | 70.23 | |
| 17 | 1.523723 | 0.4449 | | | |
| 18 | 3.472078 | 0.0833 | 1.80518 | 25.42 | |
| 19 | 1.147274 | 0.4055 | 1.49700 | 81.54 | |
| 20 | −3.773128 | 0.0167 | | | |
| 21 | −7.350230 | 0.3833 | 1.49700 | 81.54 | |
| 22 | −1.099140 | 0.0833 | 1.80518 | 25.42 | |
| 23 | −2.543342 | 0.0167 | | | |
| 24 | 3.670545 | 0.3833 | 1.56883 | 56.36 | |
| 25 | −3.818854 | 1.3887 | | | |
| 26 | ∞ | 0.1278 | 1.51680 | 64.20 | |
| 27 | ∞ | 0.3202 | | | |

TABLE 10

EXAMPLE 5·SPECIFICATION (d-LINE)

| | |
|---|---|
| f | 1.00 |
| Bf | 1.79 |
| Fno. | 1.90 |
| 2ω[°] | 85.2 |

Table 11 shows values corresponding to conditional expressions (1) through (5) about the wide angle lenses in Examples 1 through 5. Here, d-line is a reference wavelength in all of the examples. The following table 11 shows values at this reference wavelength.

TABLE 11

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (1) | f/f1 | −0.95 | −0.94 | −0.92 | −0.92 | −0.88 |
| (2) | f/f3b | 0.36 | 0.36 | 0.37 | 0.36 | 0.37 |
| (3) | f/f2 | 0.36 | 0.36 | 0.38 | 0.36 | 0.37 |

TABLE 11-continued

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (4) | (R3a1 − R3a2)/(R3a1 + R3a2) | −0.17 | −0.16 | −0.11 | −0.13 | −0.08 |
| (5) | ν d2p | 23.78 | 23.78 | 23.78 | 23.78 | — |

As the above data show, all of the wide angle lenses in Examples 1 through 5 satisfy conditional expressions (1) through (4). Further, all of Examples 1 through 4, each of which includes a lens corresponding to conditional expression (5), satisfy conditional expression (5). It is recognizable that they are wide angle lenses in which various aberrations are excellently corrected while F-numbers are about 1.9, which means fast lenses, and angles of view are about 85 degrees.

Figure 12:
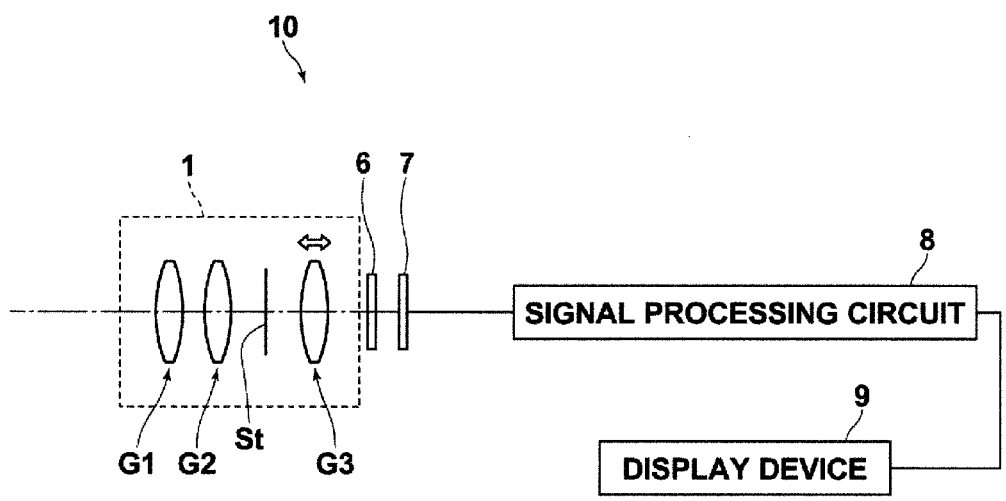
FIG. 12 is a schematic diagram illustrating the configuration of an imaging apparatus according to an embodiment of the present invention.

Next, an imaging apparatus according to an embodiment of the present invention will be described. FIG. 12 is a schematic diagram illustrating the configuration of an imaging apparatus using a wide angle lens according to an embodiment of the present invention, as an example of an imaging apparatus according to an embodiment of the present invention. In FIG. 12, each lens group is schematically illustrated. This imaging apparatus is, for example, a video camera, an electronic still camera or the like using a solid-state imaging device, such as a CCD and a CMOS, as a recording medium.

An imaging apparatus 10, such as a video camera, illustrated in FIG. 12 includes a wide angle lens 1, a filter 6, an imaging device 7 and a signal processing circuit 8. The filter 6 is arranged toward the image side of the wide angle lens 1, and has a function as a low-pass filter or the like, and the imaging device 7 is arranged toward the image side of the filter 6. The imaging device 7 converts an optical image formed by the wide angle lens 1 into electrical signals. For example, a CCD (Charge Coupled Device), a CMOS (Complementary Metal Oxide Semiconductor) and the like may be used as the imaging device 7. The imaging device 7 is arranged in such a manner that an imaging surface of the imaging device 7 and the image plane of the wide angle lens 1 match with each other.

An image imaged by the wide angle lens 1 is formed on an imaging surface of the imaging device 7. Signals about the image are output from the imaging device 7, and operation processing is performed on the output signals at the signal processing circuit 8. Further, an image is displayed on a display device 9.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

What is claimed is:

1. A wide angle lens consisting of:
a first lens group having negative refractive power as a whole;
a second lens group having positive refractive power as a whole; and
a third lens group having positive refractive power as a whole in this order from an object side,
wherein a stop is included between the second lens group and the third lens group, and
wherein the first lens group consists of a positive meniscus lens with its convex surface facing the object side and three negative meniscus lenses, each with its convex surface facing the object side, in this order from the object side, and
wherein the second lens group includes at least two cemented lenses of a 21st cemented lens and a 22nd cemented lens, and
wherein the third lens group consists of a 3a-th lens group consisting of a positive meniscus lens with its convex surface facing the object side and a 3b-th lens group that includes at least two cemented lenses of a 31st cemented lens and a 32nd cemented lens and has positive refractive power as a whole, in this order from the object side.

2. The wide angle lens, as defined in claim 1, wherein the 3b-th lens group includes a lens having positive refractive power most toward an image side.

3. The wide angle lens, as defined in claim 1, wherein the 3b-th lens group includes the 31st cemented lens, a cemented surface of which is convex toward the object side, and the 32nd cemented lens, a cemented surface of which is convex toward an image side, in this order from the object side.

4. The wide angle lens, as defined in claim 1, wherein the second lens group includes the 21st cemented lens, a cemented surface of which is convex toward an image side, and the 22nd cemented lens, a cemented surface of which is convex toward the object side, in this order from the object side.

5. The wide angle lens, as defined in claim 1, wherein focusing is performed by moving the 3b-th lens group in the direction of an optical axis.

6. The wide angle lens, as defined in claim 1, wherein the following conditional expression is satisfied:

$$-1.5 < f/f1 < -0.7 \qquad (1);$$ where f: a focal length of an entire system, and
f1: a focal length of the first lens group.

7. The wide angle lens, as defined in claim 6, wherein the following conditional expression is satisfied:

$$-1.2 < f/f1 < -0.8 \qquad (1a).$$

8. The wide angle lens, as defined in claim 1, wherein the following conditional expression is satisfied:

$$0.2 < f/f3b < 0.5 \qquad (2); \text{ and}$$

f: a focal length of an entire system, and
f3b: a focal length of the 3b-th lens group.

9. The wide angle lens, as defined in claim 8, wherein the following conditional expression is satisfied:

$$0.3 < f/f3b < 0.45 \qquad (2a).$$

10. The wide angle lens, as defined in claim 1, wherein the following conditional expression is satisfied:

$$0.2 < f/f2 < 0.5 \qquad (3);$$ where f: a focal length of an entire system, and
f2: a focal length of the second lens group.

11. The wide angle lens, as defined claim 10, wherein the following conditional expression is satisfied:

$$0.25 < f/f2 < 0.45 \qquad (3a).$$

12. The wide angle lens, as defined in claim 1, wherein the following conditional expression is satisfied:

$$-0.4 < (R3a1 - R3a2)/(R3a1 + R3a2) < 0.1 \qquad (4), \text{ where}$$

R3a1: a curvature radius of an object-side surface of the positive meniscus lens in the 3a-th lens group, and R3a2: a curvature radius of an image-side surface of the positive meniscus lens in the 3a-th lens group.

13. The wide angle lens, as defined in claim 12, wherein the following conditional expression is satisfied:

$$-0.25 < (R3a1 - R3a2)/(R3a1 + R3a2) < 0 \quad (4a).$$

14. The wide angle lens, as defined in claim 1, wherein the second lens group consists of the 21st cemented lens, a lens 2p having positive refractive power and the 22nd cemented lens in this order from the object side.

15. The wide angle lens, as defined in claim 14, wherein the lens 2p satisfies the following conditional expression:

$$vd2p < 30 \quad (5),$$

where vd2p: an Abbe number of the lens 2p.

16. The wide angle lens, as defined in claim 1, wherein the 3b-th lens group consists of the 31st cemented lens, a negative meniscus lens with its concave surface facing an image side, the 32nd cemented lens and a lens having positive refractive power in this order from the object side.

17. An imaging apparatus comprising:
the wide angle lens, as defined in claim 1.

* * * * *